United States Patent Office 3,801,585
Patented Apr. 2, 1974

3,801,585
PREPARATION OF 3,4 - DICYANO - 1,2,5-THIADI-AZOLE FROM HCN, TRIMETHYLAMINE, CHLORINE, AND SULFUR OR SULFUR DICHLORIDE
Owen Wright Webster, Wilmington, Del., assignor to E. I. du Pont de Nemours and Company, Wilmington, Del.
No Drawing. Filed Sept. 30, 1971, Ser. No. 185,347
Int. Cl. C07d 91/68
U.S. Cl. 260—302 D                                         8 Claims

ABSTRACT OF THE DISCLOSURE 3,4-dicyano-1,2,5-thiadiazole and 3,4 - dichloro - 1,2,5-thiadiazole are prepared from hydrogen cyanide, a tertiary amine, chlorine, and sulfur or sulfur dichloride.

BACKGROUND OF THE INVENTION

(1) Field of the invention

This invention relates to a new process for preparing 3,4-dicyano-1,2,5-thiadiazole. 3,4-dichloro - 1,2,5 - thiadiazole is formed along with the dicyano compound and, in some cases, may be the principal product.

(2) Description of the prior art

U.S. Pat. 2,990,409, to Carmack, Shew and Weinstein, claims 3,4-dicyano-1,2,5-thiadiazole and discloses its activity against nematodes and soil fungi. The process for preparing 3,4-dicyano-1,2,5-thiadiazole described in the patent involves preparation of 3,4-dicarboxy-1,2,5-thiadiazole by permanganate oxidation of 4-nitro-2,1,3-benzothiazole, followed by conversion of the carboxyl groups to cyano groups by a three-step process. Thus, this art process starts with a compound that is not too readily available and requires four steps.

My Canadian Pat. 849,011 of Aug. 11, 1970 (U.S. Pat. 3,564,039 of Feb. 16, 1971), describes diiminosuccinonitrile and its preparation from cyanogen and hydrogen cyanide.

(3) Related application

My copending, coassigned application Ser. No. 20,820, filed Mar. 18, 1970, now U.S. Pat. 3,666,787 describes the synthesis of diiminosuccinonitrile by the reaction of hydrogen cyanide, chlorine and a tertiary amine.

DESCRIPTION OF THE INVENTION

It has now been found that 3,4-dicyano-1,2,5-thiadiazole can be prepared directly from hydrogen cyanide, a tertiary amine, chlorine, and sulfur or sulfur dichloride. There is provided a simple, one-step synthesis of this useful compound from simple, commercially available starting materials.

When sulfur is one of the reactants, the overall process can be described by the following equation:

(1)
4HCN + 2R$_3$N + 2Cl$_2$ + S ⟶ 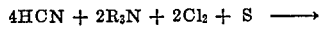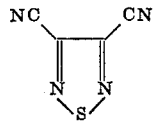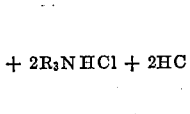 + 2R$_3$NHCl + 2HC When sulfur dichloride is used, the reaction corresponds to the following equation:

(2)
4HCN + 2R$_3$N + Cl$_2$ + SCl$_2$ ⟶ 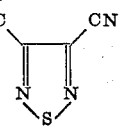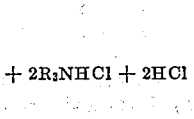 + 2R$_3$NHCl + 2HCl In Equations 1 and 2, the term R$_3$N represents a tertiary amine, the scope of which is described below.

Tertiary amines suitable for use in this process are compounds composed solely of carbon, hydrogen and nitrogen and containing from 3 to 30 carbon atoms and from 1 to 4 nitrogen atoms, each nitrogen atom having each of its three bonds connected directly to a separate aliphatic carbon atom, said compounds being free of aliphatic carbon-to-carbon unsaturation (ethylenic, dienic or acetylenic). Such tertiary amines include trimethylamine, triethylamine, N,N-dimethylcyclohexylamine, tetraethylmethylenediamine, N,N-dimethylbenzylamine, tribenzylamine, tris(phenethyl)amine, N-methylpiperidine, triethylenediamine, hexamethylenetetramine, and the like. These include compounds of the formula R$_3$N, in which N represents one equivalent of nitrogen in the tertiary amine and each R represents attachment of the nitrogen atom to a separate aliphatic carbon atom. Thus, the R's may be separate lower alkyl groups of up to 6 carbon atoms or arylalkyl groups of up to 10 carbon atoms or the R's may represent alkyl or alkylene linkages in tertiary amines containing more than one nitrogen atom. Preferred tertiary amines are those less readily oxidized by chlorine and for this reason trimethylamine, which contains only primary hydrogen atoms, is particularly preferred.

For convenience and efficiency, the mole ratios of starting material are usually those dictated by the stoichiometries of Equations 1 and 2, i.e., an HCN:R$_3$N:Cl$_2$:S mole ratio of 4:2:2:1, or an HCN:R$_3$N:Cl$_2$:SCl$_2$ mole ratio of 4:2:1:1. Any one or more reactants can be present in moderate excess, e.g., about 25%, if desired.

3,4-dichloro-1,2,5-thiadiazole is formed along with the 3,4-dicyano compound in all embodiments of the process. If two moles of HCN are used instead of four, i.e., an HCNR$_3$N:Cl$_2$:S mole ratio of 2:2:2:1 or an HCN:R$_3$N:Cl$_2$:SCl$_2$ mole ratio of 2:2:1:1, the dichloro compound becomes the major product. 3,4-dichloro-1,2,5-thiadiazole is claimed as a composition of matter in Vest, U.S. Pat. 3,115,497. The present process does not require the use of preformed cyanogen.

No solvent or liquid reaction medium is required, and the process may be carried out using neat reactants. However, since the reaction mixtures, particularly with the preferred tertiary amines, tend to solidify, it is preferred to use an aprotic solvent or diluent that is inert to the reactants and product. Preferred aprotic solvents include hydrocarbons such as toluene and xylene; halogenated hydrocarbons such as dichloromethane, dichloroethane, and Freons®, e.g., CCl$_3$F, CCl$_2$F$_2$, CHCl$_2$F, CHClF$_2$, C$_2$Cl$_3$F, and C$_2$Cl$_2$F$_4$; amides such as dimethylformamide and dimethylacetamide; ethers such as tetrahydrofuran and dioxane; sulfones such as methyl sulfone and tetramethylene sulfone. Solvents that are least readily attacked by chlorine are preferred.

The usual procedure is to condense the chlorine in a cold mixture or solution of the hydrogen cyanide, the tertiary amine, and the solvent or diluent if one is used. This operation is best carried out at temperatures below 0° C., to facilitate condensation of the chlorine and prevent evaporation of the other materials. Then the sulfur or sulfur dichloride is added. The reaction temperature can be anywhere between about −80° C. and 100° C.; preferably it is between about −40° C. and 25° C. Subatmospheric pressures, e.g., down to as low as 0.01 atm., or superatmospheric pressures, e.g., as high as 1000 atm. or even higher, can be used if desired. For convenience, however, the process is usually conducted in an open system at atmospheric pressure or in a closed system at autogenous pressure, usually slightly above atmospheric. The time will of course vary with the temperature, the required time decreasing as the temperature is increased. The reaction is usually essentially complete in from 1 to about 24 hrs. One skilled in the art can readily determine the optimum time for a given set of conditions.

EMBODIMENTS OF THE INVENTION

The following examples illustrate the process of the invention. In Examples 1 and 2 the $HCN/(CH_3)_3N/Cl_2$ mixtures were allowed to stand for 3.5 hours and 2.5 hours before the sulfur-containing reactants were added. This was done to insure maximum formation of di-iminosuccinonitrile and/or bis(chloroimino)succinonitrile, which are possible intermediate(s) in the process. No reason is seen why the desired product would not be formed, perhaps in slightly lower yield, if the sulfur-containing reactant were added directly after the last of the chlorine.

EXAMPLE 1

Preparation of 3,4-dicyano-1,2,5-thiadiazole

Chlorine (12.5 g.; 8.0 ml. at —35° C.) was condensed on a surface cooled by solid carbon dioxide and dropped into a solution of 21.5 g. (30.8 ml. at 0° C.) of hydrogen cyanide, 25.8 g. (39.0 ml. at 0° C.) of trimethylamine, and 200 ml. of dichloromethane at —80° C. The mixture was stirred for 3.5 hrs. at —40° C. to —30° C. and 25.9 g. of sulfur dichloride was then added dropwise with stirring between —20° C. and 25° C. (exothermic reaction). The mixture was filtered, and the filtrate was evaporated to dryness. The residue was agitated with a mixture of water and dichloromethane. The dichloromethane layer was separated, dried, and evaporated, to give 12.05 g. of 3,4-dicyano-1,2,5-thiadiazole, identified by comparison of its infrared absorption spectrum with that of an authentic sample.

EXAMPLE 2

Chlorine (40 g.; 25.9 ml.) was condensed into a solution of 70 g. (100 ml.) of hydrogen cyanide, 83.5 g. (126.5 ml.) of trimethylamine, and 660 ml. of dichloromethane at —35° C. over a period of 1 hr. The solution was stirred at —35° C. to —30° C. for two hours, after which 47 g. (30 ml.) of additional chlorine was added over 0.5 hr. Sulfur (30.0 g.) was added, and the mixture was allowed to warm to 25° C. and stirred overnight at room temperature. Water (1.5 l.) was added, and the mixture was agitated by stirring and then filtered. The dichloromethane layer of the filtrate was separated, dried, and evaporated, to give 56 g. of 3,4-dicyano-1,2,5-thiadiazole, again identified by its infrared absorption spectrum.

EXAMPLE 3

Preparation of 3,4-dichloro-1,2,5-thiadiazole

A solution of 70 g. of hydrogen cyanide, 153 g. of trimethylamine, and 1 liter of tetrahydrofuran was cooled to —80° C. and 95 g. (61 ml. at —35° C.) of chlorine was added over 1 hour at —70° C. to —60° C. The mixture was stirred at —55° to —50° C. for 2 hours and then at —40° C. for 0.5 hour. It was then cooled to —70° C., and 41.5 g. of sulfur was added. An additional amount of chlorine (95 g.) was added over 1 hour at —60° to —50° C. The mixture was then stirred at room temperature for 16 hours. The slurry was filtered, and the solids were washed with 500 ml. of tetrahydrofuran. The solid product was partitioned in 1 liter of water and 1 liter of dichloromethane. The dichloromethane layer was dried and combined with the tetrahydrofuran filtrate and washings. On distillation, 39.5 g. of 3,4-dichloro-1,2,5-thiadiazole, B.P. 67–68° C./80–87 mm. was obtained. Analysis by gas chromatography and mass spectroscopy showed it to contain 19.7 g. of 3,4-dicyano-1,2,5-thiadiazole. The pure compound can be separated by preparative-scale gas chromatography or by precision distillation. 3-chloro-4-cyano-1,2,5-thiadiazole is also formed in this process.

Since obvious modifications and equivalents in the invention will be evident to those skilled in the chemical arts, I propose to be bound solely by the appended claims.

The embodiments of the invention in which an exclusive property or privilege is claimed are defined as follows:

1. The process of preparing 3,4-dicyano-1,2,5-thiadiazole and 3,4-dichloro-1,2,5-thiadiazole which comprises reacting, in liquid phase,
    (a) hydrogen cyanide;
    (b) chlorine;
    (c) at least one tertiary amine composed solely of carbon, hydrogen and nitrogen and containing from 3 to 30 carbon atoms and from 1 to 4 nitrogen atoms, each nitrogen atom having each of its three bonds connected directly to a separate aliphatic carbon atom, said compounds being free of aliphatic carbon-to-carbon unsaturation; and
    (d) sulfur or sulfur dichloride, added to the liquid phase after the other reactants, at a temperature in the range from about —80° C. to about 100° C.

2. The process of claim 1 accomplished in an inert aprotic diluent.

3. The process of claim 1 in which chlorine is mixed with hydrogen cyanide and trimethylamine and the resultant mixture sequentially reacted with sulfur.

4. The process of claim 3 wherein the $HCN:amine:Cl_2S$ mole ratio is about 4:2:2:1.

5. The process of claim 3 wherein the $HCN:amine:Cl_2S$ mole ratio is about 2:2:2:1.

6. The process of claim 1 in which chlorine is mixed with hydrogen cyanide and trimethylamine and the resultant mixture sequentially reacted with sulfur dichloride.

7. The process of claim 6 wherein the $$HCN:amine:Cl_2:SCl_2$$

mole ratio is about 4:2:1:1.

8. The process of claim 6 wherein the $$HCN:amine:Cl_2:SCl_2$$

mole ratio is about 2:2:1:1.

References Cited

UNITED STATES PATENTS 3,666,787   5/1972   Webster _____ 260—465.5 R

RICHARD J. GALLAGHER, Primary Examiner

U.S. Cl. X.R.

260—465.5 A

UNITED STATES PATENT OFFICE
CERTIFICATE OF CORRECTION

Patent No. 3,801,585   Dated May 17, 1974

Inventor(s) OWEN WRIGHT WEBSTER

It is certified that error appears in the above-identified patent and that said Letters Patent are hereby corrected as shown below:

Col. 1, line 60 - "2HC" should be "2HCl". Col. 2, line 5 - insert a colon after the first "HCN". Col. 4, line 39 - insert a colon after "Cl$_2$". Col. 4, line 42 - insert a colon after "Cl$_2$".

Signed and sealed this 10th day of September 1974.

(SEAL)
Attest:

McCOY M. GIBSON, JR.
Attesting Officer

C. MARSHALL DANN
Commissioner of Patents